(12) United States Patent
Aden et al.

(10) Patent No.: US 11,781,990 B2
(45) Date of Patent: Oct. 10, 2023

(54) AUTO-FOCUSSING LIBS SYSTEM (71) Applicant: Foss Analytical A/S, Hilleroed (DK)

(72) Inventors: Daniel Aden, Hilleroed (DK); Ahmed Fadil, Hilleroed (DK)

(73) Assignee: Foss Analytical A/S, Hilleroed (DK)

( * ) Notice: Subject to any disclaimer, the term of this patent is extended or adjusted under 35 U.S.C. 154(b) by 203 days.

(21) Appl. No.: 17/441,910

(22) PCT Filed: Apr. 5, 2020

(86) PCT No.: PCT/IB2020/053242
§ 371 (c)(1),
(2) Date: Sep. 22, 2021

(87) PCT Pub. No.: WO2020/234657
PCT Pub. Date: Nov. 26, 2020

(65) Prior Publication Data
US 2022/0146432 A1 May 12, 2022

(30) Foreign Application Priority Data
Apr. 5, 2019 (DK) .............................. PA201900627

(51) Int. Cl.
*G01N 21/71* (2006.01)
(52) U.S. Cl.
CPC ..... *G01N 21/718* (2013.01); *G01N 2201/068* (2013.01); *G01N 2201/06113* (2013.01); *G01N 2201/126* (2013.01)
(58) Field of Classification Search
CPC ....... G01N 21/718; G01N 2201/06113; G01N 2201/068; G01N 2201/126
See application file for complete search history.

(56) References Cited

U.S. PATENT DOCUMENTS

| 9,267,842 B2 | 2/2016 | Day | |
|---|---|---|---|
| 2014/0204378 A1* | 7/2014 | Day | G01J 3/443 356/326 |

(Continued)

FOREIGN PATENT DOCUMENTS

| CN | 107783242 A | 3/2018 |
|---|---|---|
| WO | WO-2012040769 A1 | 4/2012 |

(Continued)

OTHER PUBLICATIONS

International Search Report and Written Opinion of the International Searching Authority for International Application No. PCT/IB2020/053242 dated Jul. 3, 2020.

(Continued)

*Primary Examiner* — Jamil Ahmed
(74) *Attorney, Agent, or Firm* — Harness, Dickey & Pierce, P.L.C.

(57) ABSTRACT

A LIBS analysis system comprises a focusing lens arrangement having a focal plane; a laser for propagating a laser beam through the focusing lens arrangement to be focused at the focal plane; a detector for generating an output that is proportional to an intensity of incident electromagnetic radiation that is incident on the detector; a translation mechanism configured to cause a relative movement of the sample holder and the focusing lens arrangement to vary a position of the focal plane along the optical path with respect to the sample holder; and a controller configured to automatically control the translation mechanism to cause the relative movement of the sample holder and the focusing lens arrangement to achieve an optimum position at which the focal plane and an analysis region of the upper surface intersecting the optical path are at or are close to coincidence.

16 Claims, 8 Drawing Sheets

(56) References Cited

U.S. PATENT DOCUMENTS

2015/0138545 A1    5/2015  Day et al.
2018/0021885 A1    1/2018  O'Connor et al.

FOREIGN PATENT DOCUMENTS

WO    WO-2018098558 A1    6/2018
WO    WO-2018/209437 A1    11/2018

OTHER PUBLICATIONS

Danish Search Report for Danaish Application No. PA 2019 00627 dated Sep. 3, 2019.

* cited by examiner

Fig. 8 ature imageimports# AUTO-FOCUSSING LIBS SYSTEM

CROSS-REFERENCE TO RELATED APPLICATIONS

This application is a National Stage of PCT/IB2020/053242, filed on Apr. 5, 2020, which claims priority to Danish Patent Application PA201900627, filed on May 23, 2019 in the Danish Patent and Trademark Office, the entire contents of each of which are incorporated herein in their entirety.

BACKGROUND

The present application relates to an auto-focusing laser-induced breakdown spectroscopy ('LIBS') analysis system and to a method of auto-focusing in a LIBS analysis system.

LIBS analysis systems are known and used to detect the presence and/or concentration of lower atomic numbered elements in a sample with some accuracy. These devices typically include a high powered laser that sufficiently heats a portion of the sample to produce a plasma. As the plasma cools, eventually the electrons return to their ground states. In the process, photons are emitted at wavelengths unique to the specific elements comprising the sample. The detection and analysis of these photons in the LIBS analysis system enables a quantitative and/or a qualitative determination of the elemental makeup of a sample to be made.

In order to obtain a sufficiently high power density to generate a plasma it is necessary to focus the laser into a small spot size, typically 100 picometers or less. The very small beam spot size on the sample requires that the laser must be focused precisely on the surface of the sample being analysed for consistent analytical results. Since the sample being analysed is typically inhomogeneous, at least relative to the size of region sampled by the laser beam, the LIBS analysis system often provides for a relative movement between the incident laser beam and the sample surface so that the sample may be analysed at a plurality of different surface regions in order to obtain a more representative determination of its elemental makeup. However, very often the sample being analysed has a relatively uneven surface so that as the sample is moved to expose different regions of its surface for LIBS analysis the laser must to be repeatedly re-focused.

It is known from U.S. Pat. No. 9,267,842 to provide a handheld auto-focusing LIBS analysis system comprising a focusing lens configured for movement along a first axis, an ablation laser having an output directed along the first axis and through the focusing lens, a spectrometer outputting intensity data from a sample mounted for relative movement in a plane perpendicular to the first axis, and a controller system which is responsive to the spectrometer output and is configured to effect relative movement of the sample to expose a plurality of different regions for analysis, and at each of the different regions to repeatedly energize the laser, process the output of the spectrometer, and adjust the position of the focusing lens relative to the sample until the spectrometer output indicates a maximum or near maximum intensity of a plasma generated by the ablation laser output focused to a spot at that region of the sample. Unfortunately this auto-focusing scheme requires that a plurality of measurements, each at a different position of the lens along the first axis, are made at each sampling region in order to establish the optimum focus of the laser output for LIBS analysis at that region. This leads to an increased analysis time for a sample and to possible errors in the analysis results due to a high number of laser ablation instances at the same region.

SUMMARY

According to a first aspect of the present invention there is provided a LIBS analysis system comprising a focusing lens having a focal plane; a laser configured to propagate a laser beam in a direction along an optical path through the focusing lens to be focused at the focal plane; a detector having an output proportional to an intensity of incident electromagnetic radiation; a sample holder for holding a sample with an upper surface intersecting the optical path; a translation mechanism operable to effect a relative movement of the sample holder and the focusing lens to vary a location of the focal plane along the optical path with respect to the sample holder; and a controller configured to automatically control the operation of the translation mechanism to effect the relative movement to achieve an optimum position at which the focal plane and an analysis region of the upper surface intersecting the optical path are at or are close to coincidence wherein the controller is further configured to calculate the optimum position from a mathematical transform stored in a memory accessible by the controller, which transform correlates measured data for a region of the upper surface intersecting the optical path with optimum location and which is generated using the output obtained from electromagnetic radiation from plasma created by the laser beam striking one or more other regions of the upper surface of the sample. By employing a transform by which the optimum position for the laser at each sampling region is calculated, rather than measured, the number of none-analysis measurements is reduced.

In an embodiment the controller is configured to control the LIBS analysis system to perform a profile generation cycle during which cycle the controller is configured to operate the translation mechanism to effect the relative movement so as to achieve a plurality of different positions of the focal plane along the optical path with respect to the sample holder at a first other region of the upper surface; to operate the laser to generate a plasma at each of the plurality of different positions and to obtain into the memory a representation of the detector output obtained from electromagnetic radiation from the plasma generated at each of the plurality of different positions indexed against position as intensity data for use in generating the mathematical transform. In some embodiments the controller is configured to process the intensity data to generate a mathematical expression linking detector output to position of the focal plane and to store the mathematical expression in the memory as the mathematical transform. Thus the number of plasma generating events performed at the sampling region for autofocusing purposes is reduced, preferably to one event.

In an embodiment the controller is configured to operate the translation mechanism to move the sample stage in a plane perpendicular to the optical path to serially intersect a plurality of different other regions of the upper surface with the optical axis, each different other region having a different known location in the plane; to operate the laser beam to create a plasma at each of the plurality of different other regions and to generate the mathematical transform from a comparison of the detector output at each of the different known locations in the plane with the intensity data. The mathematical transformation links information identifying the optimum position with location of a region in the plane perpendicular to the optical path and the controller is configured to operate the LIBS system to collect location of an analysis region as the measured data. This has an advantage that an optimum location may be calculated for a region on the sample surface from a knowledge of the location of that region without having to first ablate that region. Thus LIBS analysis measurements may be performed on an un-ablated region of the sample surface.

According to a second aspect of the present invention there is provided a method of operating a LIBS analysis system according to the first aspect comprising automatically adjusting a location of focus of the laser beam output by the laser of the LIBS analysis system to the optimum location by automatically controlling the operation of the translation mechanism to effect the relative movement to achieve an optimum location at which the focal plane and a region of the upper surface intersecting the optical path are at or are close to coincidence wherein the method further comprises generating using the controller a mathematical transform which correlates measured data for a region of the upper surface intersecting the optical path with optimum location and which is generated using the output obtained from electromagnetic radiation from plasma created by the laser beam striking one or more other regions of the upper surface of the sample; obtaining measured data for a region of the upper surface and applying the mathematical transform to the measured data to determine the optimum location. Advantages corresponding to the first aspect may thus be achieved.

BRIEF DESCRIPTION OF THE DRAWINGS

These and other advantages of the present invention will be better understood from a consideration of the following description of one or more none limiting embodiments, made with reference to the drawings of the accompanying figures, of which.

DETAILED DESCRIPTION

Figure 1:
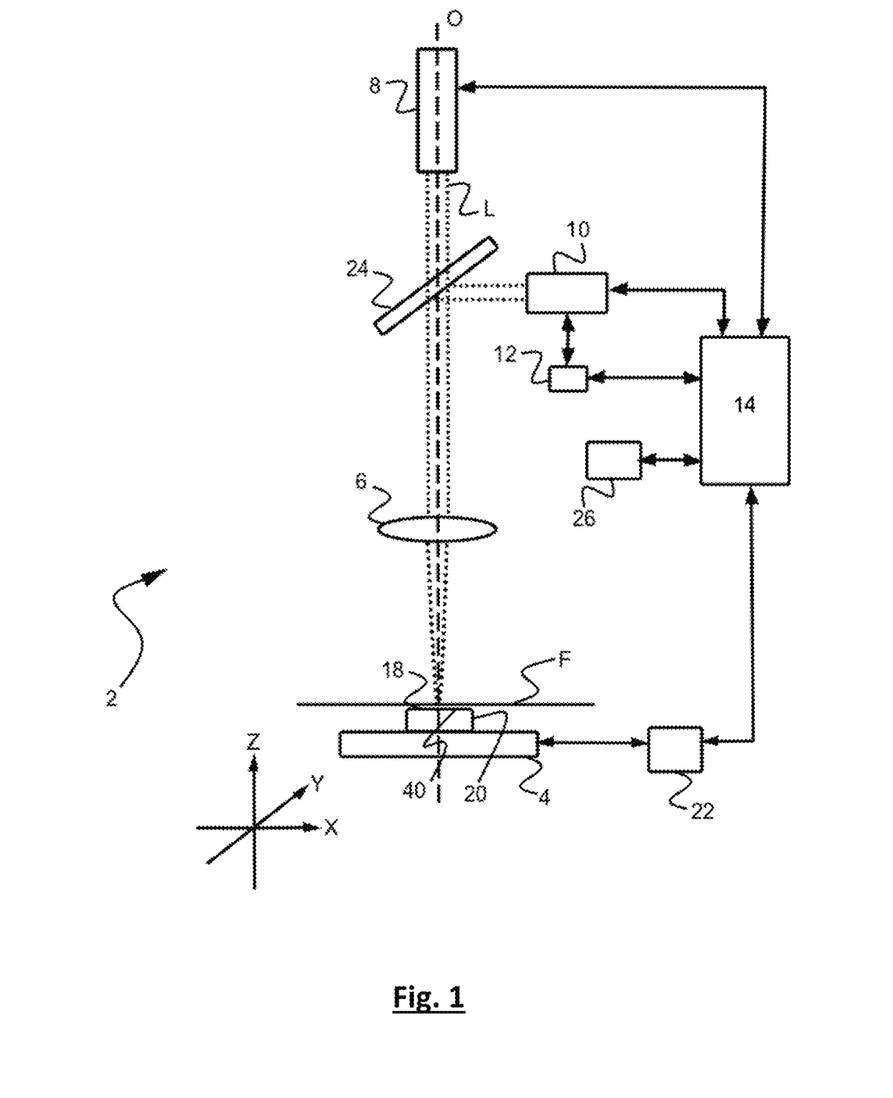
FIG. 1 shows a schematic functional block diagram of a LIBS system according to the present invention.

An example of a LIBS analysis system 2 according to the present invention is illustrated schematically in FIG. 1 as comprising a sample stage 4; focusing lens arrangement 6; laser 8; detector 10; elemental composition determining unit 12 and controller 14.

The laser 8 is orientated such that when energised, in the present embodiment under control of controller 14, a collimated laser beam L is generated which is directed along an optical path O through the focusing lens arrangement 6 and towards the sample stage 4, to strike an analysis region 40 of an upper surface 18 of a sample 20 located on the sample stage 4. Typically the sample 20 is of known size and approximate geometry and in the present example is a cylindriform sample with a circular cross section. In the following it will be assumed that this sample 20 has a generally convex upper surface 18, having its highest point at the centre. This is typically the shape assumed by LIBS samples formed from pressed granular or particulate material. However, as will be made clear below, such knowledge of sample geometry and topology is not essential to the present invention, The focusing lens arrangement 6 is configured to focus the laser beam L at a focal plane F which is located at a given position along the optical path O. Relative movement of the focusing lens arrangement 6 and the sample stage 4 may be made under control of the controller 14 in order to bring the focal plane F in coincidence (or near coincidence) with the upper surface 18 of the sample 20. A plasma is produced by the laser beam L striking the analysis region 40 of the upper surface 18 which has a maximum (or near maximum) intensity when this coincidence (or near coincidence) is achieved.

The controller 14 may include one or more micro-processors, data processors, memory devices, digital signal processors, analog and/or digital circuitry or similar components, and/or application specific integrated circuit devices and may be distributed, for example, one data processor can be associated with the elemental composition determining unit 12 while another data processor can be configured to determine intensity profile data (as described below) and a micro-controller can be associated with the laser 8 and another micro-controller with a translation mechanism 22. The same is true with respect to the algorithms, software, firmware, and the like employed to configure the controller 14 to operate as described below.

The translation mechanism 22 is provided to effect the relative movement and may comprise a stepper motor, a worm drive, an electromagnetic coil or other means of translation. In the present embodiment the translation mechanism is configured to control the movement of the sample stage 4 at least in a direction parallel with the optical path O (the 'z' direction) in response to instructions from the controller 14. In the present embodiment the translation mechanism 22 is further configured to effect movement of the sample stage 4 in a plane perpendicular to the z-direction (the 'x-y' plane illustrated in FIG. 1 and FIG. 2) so that the laser beam L can strike different regions of the upper surface 18 of the sample 20 as relative movement between the laser beam L and the sample 20 on the sample stage 4 is made in the x-y plane. Thus the present translation mechanism 22 is configured to control movement of the sample stage 4 independently in three orthogonal directions (the x, y and the z directions). In some embodiments the translation mechanism 22 may be distributed, comprising two or more separate units, and may additionally or alternatively control movement of the focusing lens arrangement 6 to effect one or both of the relative movements in the z direction and in the x-y plane. In some embodiments the translation mechanism 22 may be configured to effect rotation of the sample stage 4 (hence sample 20) in the x-y plane about an axis parallel to the z direction.

The detector 10 is configured to generate an output which is proportional to the intensity of electromagnetic radiation incident thereon. In the present embodiment the detector 10 comprises a spectrometer configured to generate an electrical signal output that is indicative of the magnitude of received electromagnetic radiation as a function of wavelength for processing by one or both of the controller 14 and the elemental composition determining unit 12. The detector 10 is located to receive electromagnetic radiation of the plasma produced by the laser beam L generated by the laser 8 striking the upper surface 18 of the sample 20. Electromagnetic radiation from the plasma travels along a detection path, that in the present embodiment includes the focusing lens arrangement 6; an optical element 24, and to the detector 10.

The optical element 24 is located along the optical path O between the laser 8 and the focusing lens arrangement 6 and is formed to pass the laser beam L and to reflect the lower energy electromagnetic radiation from the plasma in a direction towards the detector 10.

The elemental composition determining unit 12 is configured to receive the electrical signal output from the detector 10 and to determine the composition of the analysis region 40 of the sample 20 which was struck by the focused laser beam L in a manner that is known in the art of LIBS analysis. In some embodiments the operation of the elemental composition determining unit 12 is controlled by controller 14 so that composition determinations are made only when the focal plane F is in coincidence (or near coincidence) with the upper surface 18 of the sample 20.

Figure 3:
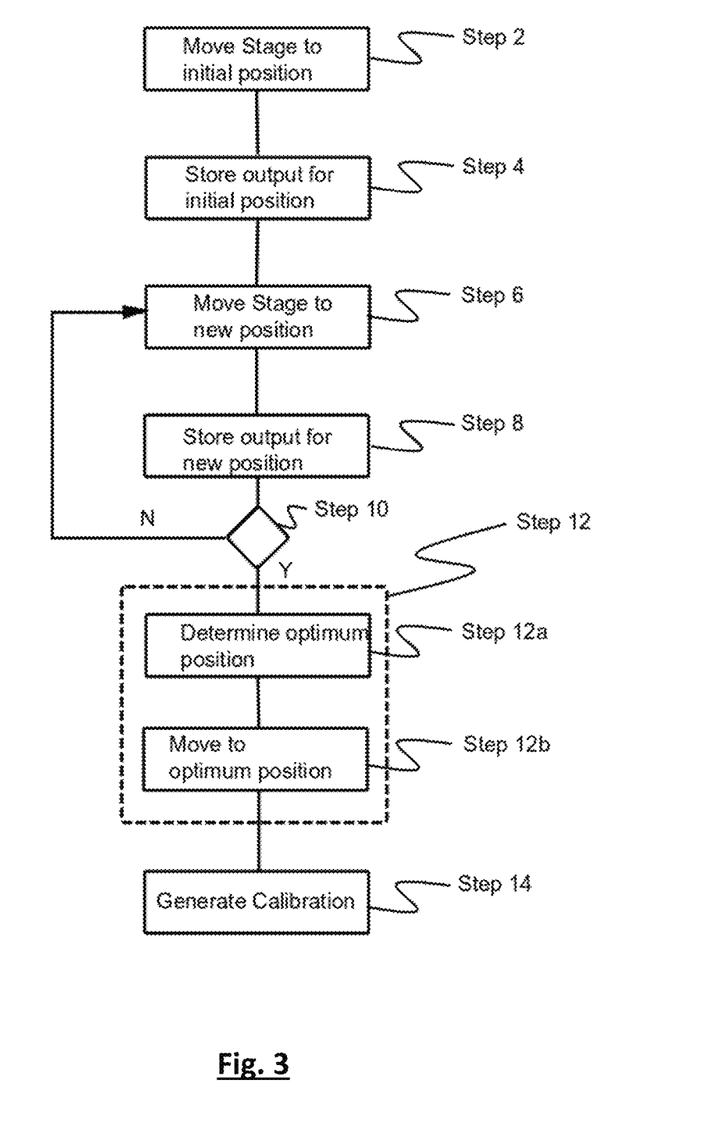
FIG. 3 shows a flow chart of the principle steps associated with the operation of a LIBS system according to the present invention.

The controller 14 is configured through suitable programming to operate the LIBS analysis system 2 substantially as illustrated in FIG. 3 in order to perform a profile generation cycle for each sample 20 placed on the sample stage 4. During this profile generation cycle intensity data is collected for a first other region 16 of the upper surface 18 which is different from the analysis region 40. This intensity data represents measured intensity values indexed against position of the focal plane F for a plurality of different positions of the focal plane F along the optical path O. In the present embodiment the controller 14 energises the translation mechanism 22 to position the sample stage 4 at an initial position along the optical path O relative to the focal plane F (Step 2 of FIG. 3) and to, preferably but not essentially, align the centre of the upper surface 18 with the optical path O, so that intensity data subsequently generated will be for the first other region 16 which is here at the highest portion of the sample surface 18. The controller 14 then, in the present embodiment, energises the laser 8 to generate the laser beam L which strikes the upper surface 18 of the sample at the first other region 16. The received electrical signal output from the detector 10 indexed against a representation of the initial position is stored in a memory 26 (Step 4 of FIG. 3) as an element of the intensity data. The controller 14 then operates to energise the translation mechanism 22 to move the sample stage 4 to a new position along the optical path O relative to the focal plane F (Step 6 of FIG. 3); to cause the laser 8 to again emit a beam L to strike the first other region 16 and to store the received electrical signal output from the detector 10 indexed against a representation of the new position in a memory 26 (Step 8 of FIG. 3) as further elements of the intensity data. These steps (Step 6 and Step 8) are repeated until it is determined in the controller (Step 10) that a final position along the optical path O has been reached. The initial and final positions of the sample stage 4 along the optical path O relative to the focal plane F correspond to a predetermined range of positions selected to ensure that the position at which the focal plane F is in coincidence (or near coincidence) with the upper surface 18 of the sample 20 on the sample stage 4 is encompassed. This position represents an optimum position at which the intensity of electromagnetic radiation which is incident on the detector 10 is at a maximum (or near maximum). In one embodiment the variation in position is done iteratively so that the sample stage 4 takes discrete positions between the initial and the final positions. In another embodiment the variation in position is done substantially continuously between the initial and the final positions. In some embodiments the laser 8 may be energised by the controller 14 only during one direction of movement of the sample stage 4 and in other embodiments the laser 8 is energised during a bi-directional movement of the sample stage 4.

Figure 2:
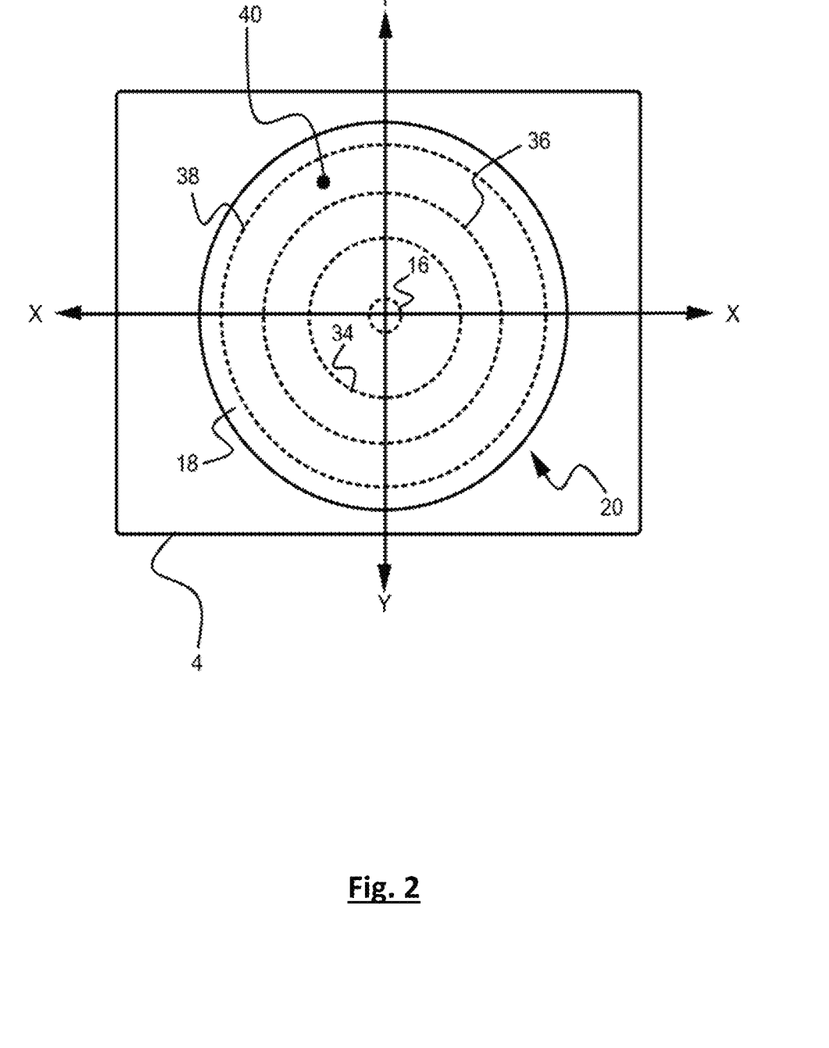
FIG. 2 shows a plan view of a sample and sample stage of the LIBS system represented in FIG. 1.

In some embodiments the controller 14 may energise the translation mechanism 22 during this intensity data generation cycle to move the sample stage 4, such as to describe a circle (as illustrated in FIG. 2) as the first other region 16, in order to expose a new portion of the upper surface 18 for each new position of the sample stage 4 along the optical path O. Each new portion of the first other region 16 should be sufficiently close to the previous new portion of that region 16 so that the topography of the upper surface 18 does not change significantly (that is, have no measurable effect on the plasma due to height changes) and that the composition remains constant within the limit that compositional variations do not measurably effect the intensity of the plasma.

In some embodiments the intensity of the plasma is measured at one or more specific wavelengths at each of the positions between the initial and the final positions. In some embodiments two specific wavelengths may be selected such as the Carbon plasma emission lines at 193 nanometers (nm) and at 230 nm illustrated in FIG. 4 respectively as $C_{193}$ (dark line) and $C_{230}$ (lighter line). The $C_{193}$ emission line is due to neutral carbon whereas the $C_{230}$ is due to ionized carbon and occurs at a higher plasma temperature than the $C_{193}$ emission line. Due to the characteristics of the generated plasma the higher temperature occurs in the plasma at some distance above the upper sample surface 18. This, in turn means that the position of the sample stage 4 along the z direction at which the maximum plasma intensity is achieved for each emission line ($C_{193}$ and $C_{230}$) will be different. This difference may be utilised to determine a direction in which to move the sample stage 4 in an autofocus procedure as described below. It will be appreciated that the elemental emission line may be selected based on expected sample composition, for example an emission line due to an element which makes up the basic sample matrix rather than an emission line due to a potential sample impurity should be selected (for example carbon, hydrogen or nitrogen elemental emission lines in an organic sample). The other emission line may be selected to represent the continuum plasma emission as the intensity of the continuum emission is known to increase with increasing plasma temperature.

Once the controller 14 has operated to achieve all desired positions between the initial and the final positions the controller 14 is configured to access the memory 26 (Step 12 of FIG. 3) and to process the stored intensity data in order to identify an optimum position ($z_{OPT}$) of the sample stage 4 along the z-direction corresponding to a maximum (or near maximum) intensity of the stored intensity data (Step 12a of FIG. 3) and to activate the translation mechanism 22 to move the sample stage 4 to the so identified optimum position (step 12b of FIG. 3). For example, from FIG. 4, it can be seen that in that embodiment $z_{OPT}$ is around 0.6 millimeters (mm).

The controller 14 is further configured to control the LIBS analysis system 2 to perform a calibration generation cycle (Step 14 of FIG. 3), during which cycle the controller 14 generates a mathematical transform using intensity data stored in the memory 26 which transform correlates optimum position along the z-direction with a measurable property of a region of the upper sample surface 18 and stores the mathematical transform in the memory 26 for use in an autofocus procedure described below.

In some embodiments the calibration generation cycle (Step 14) comprises generating the mathematical transform which links position of the sample stage 4 along the z-direction with intensity using the intensity data stored in the memory 26 that was obtained from the first other region 16 of the upper surface 18 of the sample 20 during the profile generation cycle. During an analysis cycle (see FIG. 5) of these embodiment the controller 14 at Step 16 operates the translation mechanism 22 to move the sample 20 in the x-y plane to present an analysis region 40 of the upper surface 18 which was not employed in the generation of the mathematical transform at Step 14. At a Step 18 the laser 8 is operated by the controller 14 to create a plasma from this analysis region 40 and the intensity of the created plasma is obtained as the measured data of a region of the upper sample surface 18 with which the mathematical transform correlates the optimum position $z_{OPT}$. At a Step 20 the controller 14 then initiates an autofocus routine during which routine the mathematical transform is applied to the obtained intensity and a position along the z-axis corresponding to this intensity is determined. This position is compared to the optimum position $z_{OPT}$ and a difference is calculated.

Figure 4:
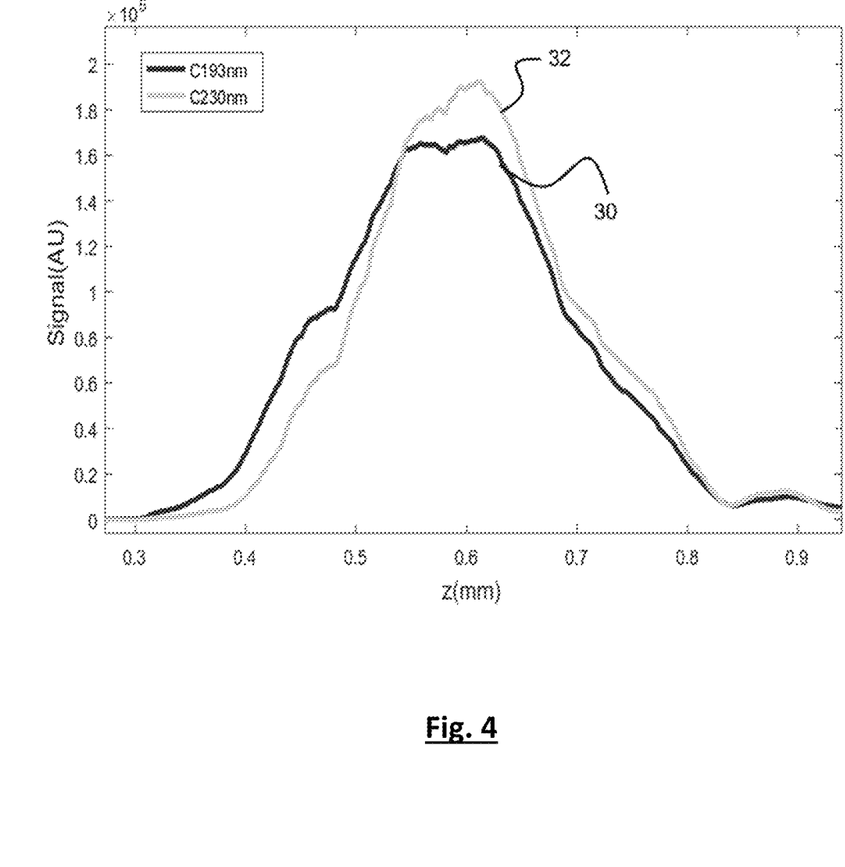
FIG. 4 shows a plot of intensity vs position along the z-axis for two carbon related plasma emissions

In some embodiments the emission intensities at two different wavelengths may be determined corresponding to different temperature emissions. As illustrated in FIG. 4, for positions along the z-direction at which the measured intensity of the higher temperature emission (here the $C_{230}$ emission) is below the other emission (here the $C_{193}$ emission) this will correspond to a sample surface below the optimum location $z_{OPT}$ and when the measured intensity is above the other this will correspond to a sample surface above the optimum location $z_{OPT}$. This information may be utilized in the controller 14 to determine a required direction of movement of the sample stage 4 along the z direction.

Figure 5:
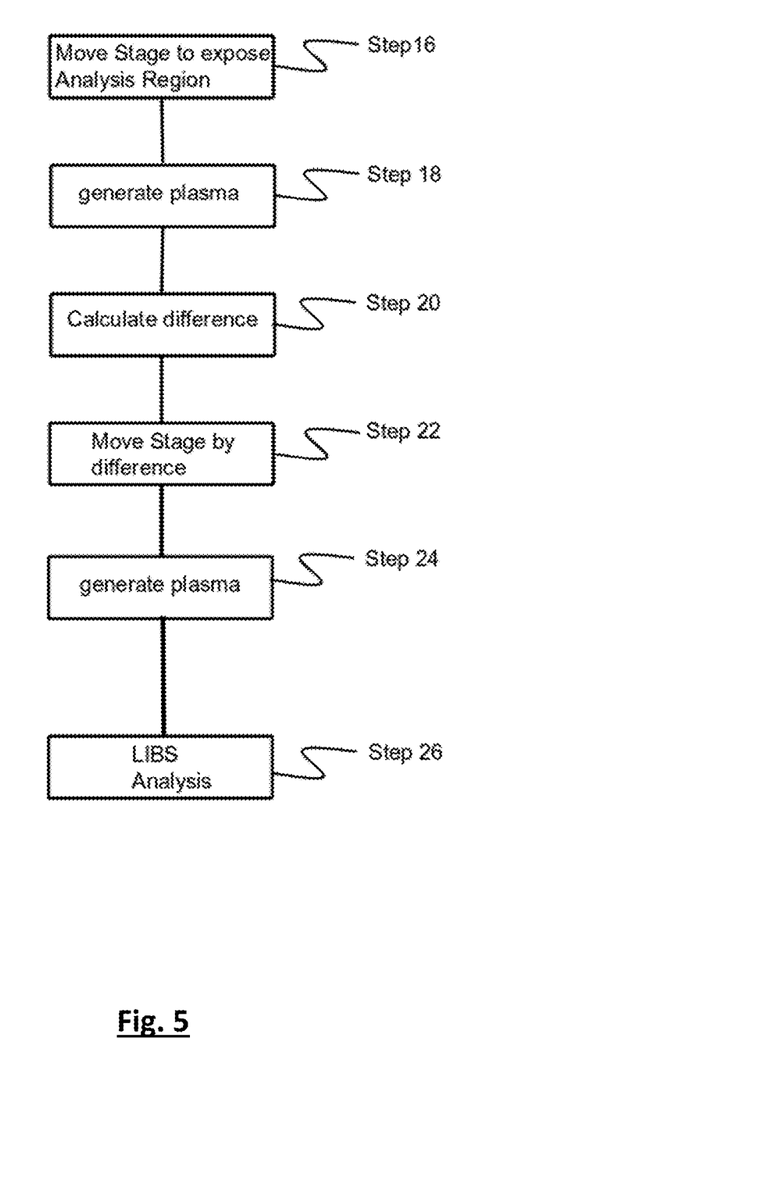
FIG. 5 shows a flow chart of the principle steps associated with the analysis cycle of a LIBS system according to the present invention.

At a Step 22 the controller 14 then operates the translation mechanism 22 to move the sample stage 4 an amount corresponding to the calculated difference (and optionally in a direction determined from a comparison of the intensities of the emissions at two wavelengths as discussed above). and thereby bring the focal plane F in to coincidence (or near coincidence) with the upper surface 18 of the sample 20 on the sample stage 4 at the analysis region 40. At a Step 24 the controller 14 then operates the laser 8 to again generate a plasma from this analysis region 40. At a Step 26 the controller 14 operates the elemental composition determining unit 12 to analyse the electrical signal output that is indicative of the magnitude of electromagnetic radiation as a function of wavelength incident on the detector 10 which it receives from the detector 10. The composition of that analysis region 40 of the sample 20 is then determined by the elemental composition determining unit 12 from this wavelength dependent intensity data in a manner that is known in the art of LIBS analysis.

Figure 6:
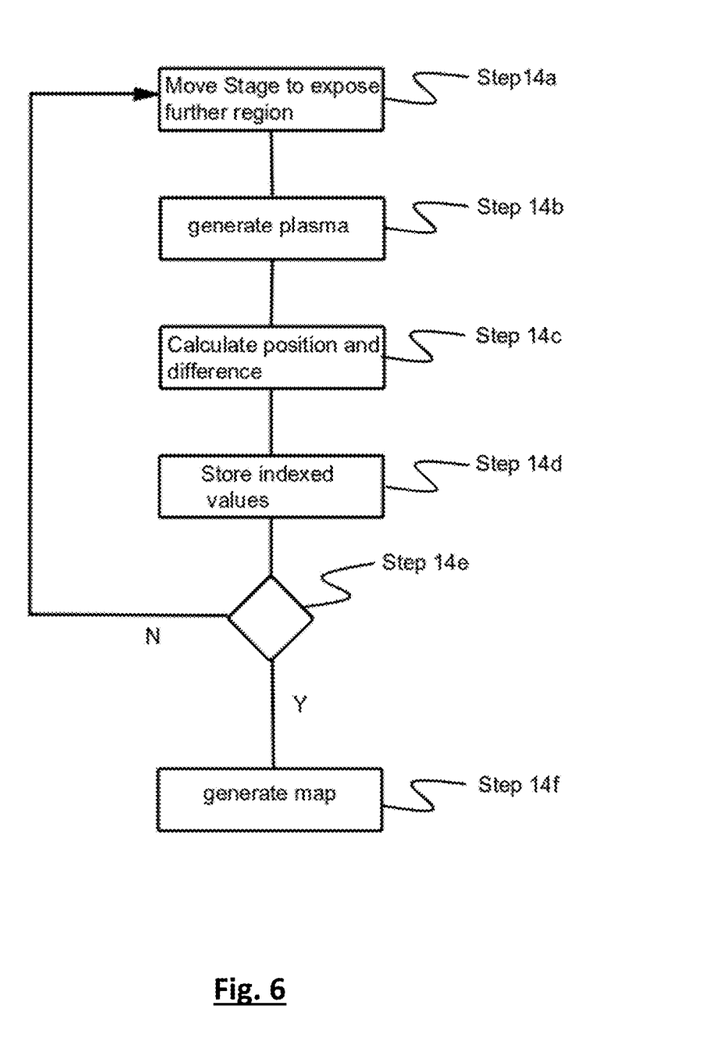
FIG. 6 shows a flow chart of the principle steps associated with the generation of a mathematical transform according to an embodiment of the method of the present invention.

In some embodiments the calibration generation cycle (Step 14) comprises performing steps illustrated in FIG. 6 in order to generate a surface map. At step 14a the controller 14 operates the translation mechanism 22 to move the sample stage a predetermined amount in the x-y plane in order to expose a further other region of the upper surface 18 of the sample 20 to the laser beam L. At step 14b the controller 14 energises the laser 8 to generate a plasma at this further other region and the detector 10 generates an output corresponding to an intensity of electromagnetic radiation from this plasma. At step 14c the controller 14 operates to determine a position along the z-direction corresponding to this intensity. This position is compared to the optimum position and in some embodiments a difference Δz between the two is calculated which at step 14d is stored in memory 26 indexed against location of this further region (such as absolute x,y position of the sample stage 4 or positions Δx, Δy measured relative to the x,y location of the first other region 16 at which the variation of intensity with position along the z-direction was recorded or other choice of origin for the coordinate system). In some embodiments this difference Δz may be determined in a later step and the determined positions along the z direction are stored in memory 26 indexed against an indication of the location of the associated further other regions.

These steps are repeated until it is determined at Step 14e that a sufficient number of further other regions of known locations in the x-y plane have been exposed to the laser beam L so that a mathematical transform can be generated. In some embodiments, with the sample stage 4 set at the optimum location $z_{OPT}$, the further other regions lie on one or more circles (illustrated in FIG. 2 as three circles 34,36, 38).

At step 14f the mathematical transform is generated which maps the amount of movement along the z-direction (Δz) needed to achieve the optimum position $z_{OPT}$ with location of the region in the x-y plane. This may be achieved by spline or polynomial surface fitting, for example using the corresponding algorithms provided in commercially available software such as Matlab® from MathWorks, Natick, Mass. 01760-2098, USA which creates a calibration that interpolates between the measured points.

Figure 7:
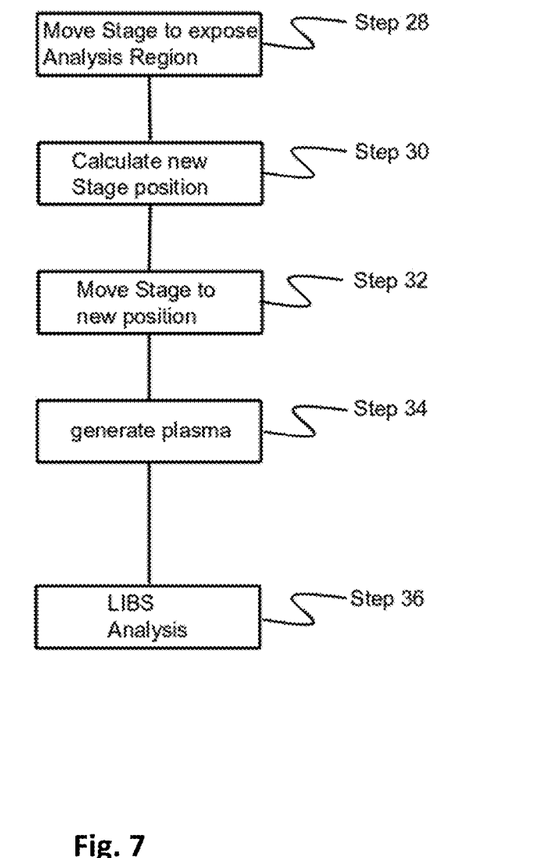
FIG. 7 shows a flow chart of the principle steps associated with the analysis cycle of a LIBS system according to the present invention employing a mathematical transform generated according to FIG. 6.

During an analysis cycle (see FIG. 7) of these embodiments which employ surface mapping as the mathematical transform at Step 28 the controller 14 operates the translation mechanism 22 to move the sample 20 a known amount in the x-y plane (Δx, Δy) to present an analysis region 40 of the upper surface 18 which was not employed in the generation of the mathematical transform at Step 14. The absolute (or alternatively the relative) location, generally an indication of the x and y coordinates, of the analysis region 40 in the x-y plane is used as the measured data of a region of the upper sample surface 18 with which the mathematical transform correlates the optimum position $z_{OPT}$. The controller 14 then initiates an autofocus routine during which routine, at Step 30, the mathematical transform is applied to the obtained location information and an amount of movement Δz along the z-axis needed to achieve the optimum position $z_{OPT}$ is calculated for the analysis region 40. At Step 32 the controller 14 then operates the translation mechanism 22 to move the sample stage 4 an amount corresponding to the calculated amount of movement Δz to thereby bring the focal plane F in to coincidence (or near coincidence) with the upper surface 18 of the sample 20 on the sample stage 4 at the analysis region 40. At Step 34 the controller 14 operates the laser 8 to generate a plasma from this analysis region 40 and at Step 36 operates the elemental composition determining unit 12 to analyse the electrical signal output that is indicative of the magnitude of electromagnetic radiation from the generated plasma as a function of wavelength incident on the detector 10 which it receives from the detector 10 and to determine the composition of that analysis region 40 of the sample 20 from this wavelength dependent intensity data in a manner that is known in the art of LIBS analysis.

An example of the LIBS analysis system 2 described with reference to FIG. 1 which is configured to operate according to the method described in relation to FIGS. 2, 3, 4, 6 and 7 will now described with reference to FIG. 8.

During an intensity data generation cycle (see FIG. 3) for a sample 20 located on the sample stage 4 the controller 14 accesses and runs program code stored in the memory 26 to cause the acquisition and storage in memory 26 of intensity data for the $C_{193}$ and $C_{230}$ emission lines. Specifically in this present embodiment, the controller 14 activates the translation mechanism 22 to move the sample stage 4 in a circle and sequentially expose a plurality of new portions of the first other region 16 of the upper surface 18 to the laser beam L. In this embodiment the translation mechanism 22 is activated to move the sample 20 so that the plurality of portions of the first other region will lie on a circle 16 close to the centre of the cylindrical sample 20. At each of the plurality of the new portions of the first other region 16 the controller 14 controls the translation mechanism 22 to move the sample stage 4 to a new position along the z direction with each position being selected so that all positions together span a predetermined range of positions that includes the optimum position $Z_{OPT}$ and positions below and above this optimum position $Z_{OPT}$. The intensity data which is stored in the memory 26 represent intensity values of the electromagnetic radiation generated by the plasma, here at 193 nm and 230 nm, indexed against position along the z direction as illustrated in FIG. 4. As discussed above in connection with FIG. 4, the curve 30 represents the variation in intensity with position z in millimetres at 193 nm and the curve 32 represents the variation in intensity at the same positions at 230 nm. A comparison of the two intensities at a same position z enables a determination of the direction of movement of the sample surface in the z direction in order to attain the optimum position $Z_{OPT}$.

The intensity data stored in memory 26 which is related to the emission at 193 nm (produced closest to the sample surface 18) is processed by the controller 14 in order to determine a position in the z-direction at which the measured intensities are at a maximum. This determined position represents the optimum position $Z_{OPT}$ at which location the focal plane F of the laser beam L and the upper surface 18 of the sample 20 are coincident (or nearly coincident) and here is determined to be 0.6 mm.

Once the optimum position $z_{OPT}$ is determined by the controller 14 a calibration generation cycle (see FIG. 6) is performed by the LIBS analysis system 2 under control of controller 14. During the calibration generation cycle the LIBS analysis system 2 is controlled to acquire plasma emission intensity data from a plurality of known locations on the upper surface 18 of the sample 20 and a fixed, same location of the sample stage 4 in the z direction relative to the optimum location $z_{OPT}$ (preferably the optimum position $z_{OPT}$). Specifically in this present embodiment, with the position of the sample stage 4 fixed at a position along the z direction relative to the optimum position $z_{OPT}$ (which fixed position is here chosen to be $z_{OPT}$), the controller 14 activates the translation mechanism 22 to move the sample stage 4 to sequentially expose a plurality of other regions describing circles 34,36,38 of the upper surface 18 of the sample 20 to the laser beam L where each region of the plurality of other regions has a known location in the x-y plane on the sample surface 18 which is different from all other regions previously exposed to the laser beam L. In this embodiment the translation mechanism 22 is activated by the controller 14 to move the sample stage 4 (hence the sample 20) so that the plurality of other regions will lie on one or more (here three) circles 34,36,38 on the upper surface 18 of the sample 20.

At each of the plurality of other regions on circles 34,36,38 the controller 14 operates the laser 8 to generate a laser beam L to strike the upper surface 18 at this other region and generate a plasma. Intensity values of electromagnetic radiation incident on the detector 10 at the two wavelengths 193 nm and 230 nm from the plasma are stored in the memory 26 together with a representation of the location of the other region, for example Cartesian coordinates (x,y) with an origin at the centre of the sample 20. Each such intensity value for the emission at 193 nm is compared in the controller 14 with the intensity values which constitute the intensity data obtained at the plurality of different positions of the sample stage 4 along the z direction and a position along the z direction determined therefrom at which the intensity value of the 193 nm emission and the intensity value of the intensity data coincides (or nearly). From this a value $\Delta z$ may be calculated as a difference between the determined position along the z direction and the optimum position $z_{OPT}$. This value $\Delta z$ thus represents the movement in the z direction required at that region in order to bring the surface at that region and the focal plane F of the laser beam L into coincidence (or near coincidence). In the present embodiment the controller 14 accesses a mathematic transform stored in the memory 26 by which intensity values are linked to position along the z direction and applies the intensity value of the 193 nm emission at that region to the transform in order to calculate the position at which the coincidence is achieved. As discussed above, a comparison of 193 nm and 230 nm intensities at this region can be employed to determine a direction of movement along the z axis necessary in order to achieve the optimum position $z_{OPT}$. One or both the determined position or the calculated value $\Delta z$ of required movement (preferably the latter) is stored in the memory 26 as movement data indexed against the location of the other region in the x-y plane.

Figure 8:
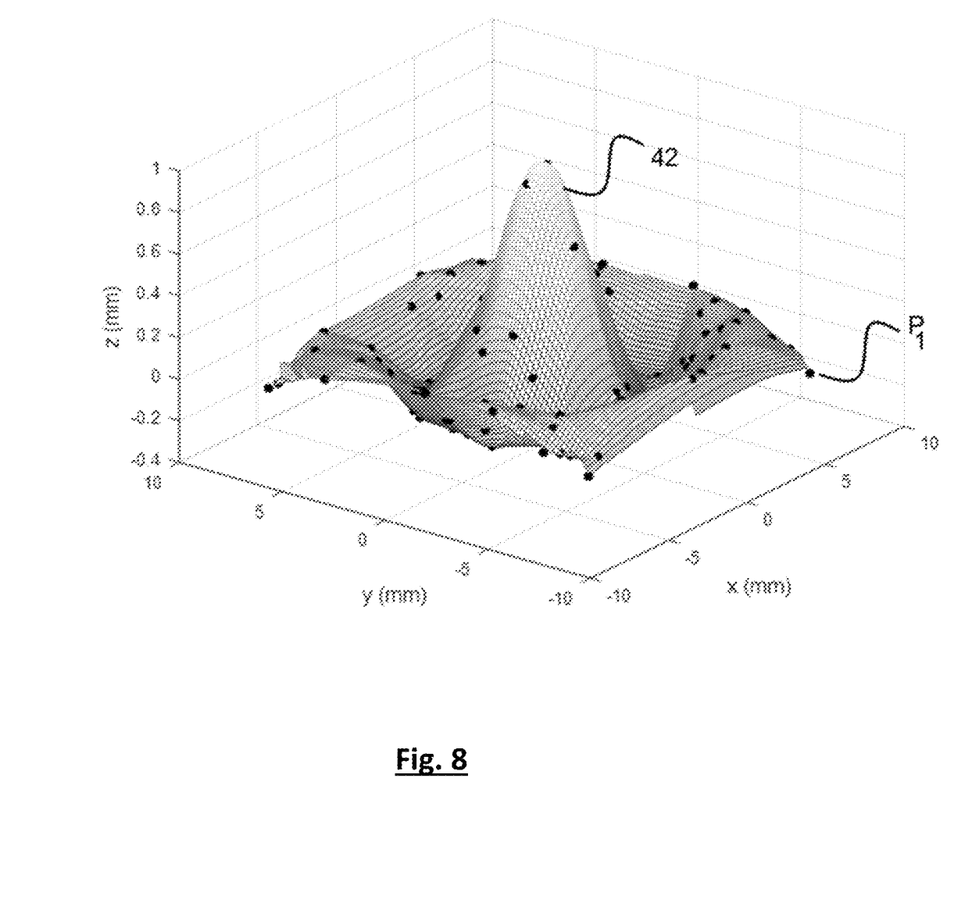
FIG. 8 shows a mesh plot of movement data for a sample surface

On acquisition of movement data for all of the plurality of the different other regions associated with the circles 34,36, 38 is collected and the controller 14 processes the acquired indexed movement data to generate a mathematical transform which links movement data to location of a region in the x-y plane and stores this transform in memory 26 (illustrated by the mesh plot 42 in FIG. 8). The mathematical transform may be generated from a cubic spline fitting of the data points (exemplified by $P_1$ in FIG. 8) using mathematical fitting algorithms commonly known in the art such as are commercially available software such as Matlab® from MathWorks, Natick, Mass. 01760-2098, USA.

The controller 14 then operates to control the LIBS analysis system 2 to perform an analysis cycle (see FIG. 7) during which the controller 14 activates the translation mechanism 22 to at least once move the sample stage 4 a known amount and expose an analysis region 40 of the upper surface 18 of the sample 20 to the laser beam L which has not previously been exposed to the laser beam L. Since the sample stage 4 is moved a known amount then the location of the analysis region 40 is known. The controller 14 operates to access the mathematical transform and apply it to the known location of this analysis region 40 (here to the x,y coordinates of the analysis region 40) in order to determine a position $z_{OPT}$ of the sample stage 4 in the z direction at which the focal plane F is coincident (or nearly coincident) with the upper surface 18 at that analysis region 40 and then controls the translation mechanism 22 to move the sample stage an amount Δz in the z direction to achieve the optimum position $z_{OPT}$. The controller 14 then causes the energisation of the laser 8. The laser beam L which is generated by the energised laser 8 strikes the exposed analysis region 40 and a plasma is generated. The output of the detector 10 which represents the intensity of electromagnetic radiation from the generated plasma striking it is passed to the elemental composition determining unit 12 for analysis therein in a manner known in the art to quantitatively or qualitatively determine the concentration or presence of elements of interest in the analysis region 40 of the upper surface 18 of the sample 20 from which the plasma was generated.

The invention claimed is:

1. A LIBS analysis system, comprising:
a focusing lens arrangement having a focal pane;
a laser configured to propagate a laser beam in a direction along an optical path through the focusing lens arrangement to be focused at the focal plane;
a detector configured to generate an output that is proportional to an intensity of incident electromagnetic radiation that is incident on the detector;
a sample stage configured to hold a sample with an upper surface intersecting the optical path;
a translation mechanism configured to cause a relative movement of the sample stage and the focusing lens arrangement to vary a position of the focal plane along the optical path with respect to the sample stage; and
a controller configured to automatically control the translation mechanism to cause the relative movement of the sample stage and the focusing lens arrangement to achieve an optimum position at which the focal plane and an analysis region of the upper surface intersecting the optical path are at or are close to coincidence, based on
accessing a memory to obtain a mathematical transform that is stored in the memory, the mathematical transform being generated using the output of the detector that is generated based on electromagnetic radiation from plasma that is created based on the laser beam striking one or more other regions of the upper surface of the sample being incident on the detector, the one or more other regions being different from the analysis region, the mathematical transform correlating measured data for the analysis region with optimum position,
calculating the optimum position based on the mathematical transform stored in the memory, and
controlling the translation mechanism to vary the position of the focal lane along the optical path with respect to the sample stage to achieve the optimum position.

2. The LIBS analysis system as claimed in claim 1, wherein the controller is configured to
operate the translation mechanism to
cause the optical path to intersect a first other region of the upper surface, and
cause the relative movement of the sample stage and the focusing lens arrangement to achieve a plurality of different positions of the focal plane along the optical path with respect to the sample stage at the first other region of the upper surface;
operate the laser to create a plasma at each of the plurality of different positions, obtain into the memory a representation of the output of the detector that is generated based on electromagnetic radiation from the plasma created at each region of the plurality of different positions indexed against position as intensity data, and
generate the mathematical transform based on processing the intensity data.

3. The LIBS analysis system as claimed in claim 2, wherein the controller is configured to generate the mathematical transform based on
processing the intensity data to generate a mathematical expression linking detector output to position of the focal plane, and
storing the mathematical expression in the memory as the mathematical transform.

4. The LIBS analysis system as claimed in claim 3, wherein the controller is configured to calculate the optimum position based on
causing the optical path to intersect the analysis region of the upper surface;
operating the laser to create a plasma at the analysis region;
obtaining into the memory the output of the detector generated based on electromagnetic radiation from the plasma that is created at the analysis region as the measured data; and
calculate the optimum position for the analysis region based on applying the mathematical transform to the measured data.

5. The LIBS analysis system as claimed in claim 2, wherein the controller is further configured to:
operate the translation mechanism to move the sample stage in a plane perpendicular to the optical path to serially intersect a plurality of different other regions of the upper surface with the optical path, each different other region having a different known location in the plane perpendicular to the optical path;
operate the laser to create a plasma at each of the plurality of different other regions, and
generate the mathematical transform based on a comparison of the output of the detector that is generated based on electromagnetic radiation from the plasma that is created at each of the different other regions with the intensity data.

6. The LIBS analysis system as claimed in claim 5, wherein
the mathematical transform links information identifying the optimum position with location of a region in the plane perpendicular to the optical path, and
the controller is configured to operate the LIBS analysis system to collect a location of the analysis region as the measured data.

7. A method of operating a LIBS analysis system, the LIBS analysis system including a focusing lens arrangement having a focal plane, a laser configured to propagate a laser beam in a direction along an optical path through the focusing lens arrangement to be focused at the focal plane, a detector configured to generate an output proportional to an intensity of incident electromagnetic radiation that is incident on the detector, a sample stage configured to hold a sample with an upper surface intersecting the optical path, a translation mechanism configured to cause a relative movement of the sample stage and the focusing lens arrangement to vary a position of the focal plane along the optical path with respect to the sample stage, and a controller configured to automatically control the translation mechanism to effect the relative movement of the sample stage and the focusing lens arrangement, the method comprising:

automatically adjusting a location of the focal plane along the optical path with respect to the sample stage to an optimum position at which the focal plane and an analysis region of the upper surface intersecting the optical path are at or are close to coincidence based on the controller automatically controlling the translation mechanism to cause the relative movement of the sample stage and the focusing lens arrangement to achieve the optimum position;

generating using the controller, a mathematical transform which correlates measured data for the analysis region with optimum position of the focal plane along the optical path with respect to the sample stage and which is generated using the output of the detector that is generated based on electromagnetic radiation from plasma that is created based on the laser beam striking one or more other regions of the upper surface of the sample being incident on the detector, wherein the one or more other regions are different from the analysis region;

obtaining measured data for the analysis region of the upper surface; and applying the mathematical transform to the measured data to determine the optimum position of the focal plane along the optical path with respect to the sample stage at the analysis region.

8. The method as claimed in claim 7, further comprising:

automatically controlling the translation mechanism to
- cause the optical path to intersect a single other region of the one or more other regions of the upper surface, and
- cause the relative movement of the sample stage and the focusing lens arrangement to achieve a plurality of different positions of the focal plane along the optical path with respect to the sample stage at the single other region of the upper surface;

operating the laser to create a plasma at each position of the plurality of different positions; and obtaining into a memory a representation of the output of the detector that is generated based on electromagnetic radiation from the plasma that is created at each of the plurality of different positions indexed against position as intensity data for use in generating the mathematical transform.

9. The method as claimed in claim 8, wherein generating the mathematical transform includes processing, in the controller, the intensity data to generate a mathematical expression linking detector output to position of the focal plane along the optical path with respect to the sample stage, and storing the mathematical expression in the memory as the mathematical transform.

10. The method as claimed in claim 9, wherein obtaining the measured data includes operating the laser to create a plasma at the analysis region of the upper surface; and adjusting the location of the focal plane along the optical path with respect to the sample stage to the optimum position includes
- calculating the optimum position for the analysis region based on applying the mathematical transform to the output of the detector that is generated based on electromagnetic radiation from the plasma that is created at the analysis region, and
- operating the translation mechanism to move the sample stage to the optimum position.

11. The method as claimed in claim 8, wherein generating the mathematical transform includes operating the controller to energize the translation mechanism and move the sample stage in a plane perpendicular to the optical path to serially intersect a plurality of different regions of the upper surface with the optical path;

operating the laser to create a plasma at each of the plurality of different regions; and storing, in the memory, the output of the detector that is generated based on electromagnetic radiation from the plasma that is created at each region of the plurality of different regions indexed against location of a corresponding region in the plane perpendicular to the optical path for use in generating the mathematical transform based on a comparison of the output of the detector that is generated based on electromagnetic radiation from plasma that is created at each location of the corresponding region in the plane with the intensity data.

12. A non-transitory computer-readable medium storing program code that is executable by a controller of a LIBS analysis system, the LIBS analysis system including a focusing lens arrangement having a focal plane, a laser configured to propagate a laser beam in a direction along an optical path through the focusing lens arrangement to be focused at the focal plane, a detector configured to generate an output proportional to an intensity of incident electromagnetic radiation that is incident on the detector, a sample stage configured to hold a sample with an upper surface intersecting the optical path, a translation mechanism configured to cause a relative movement of the sample stage and the focusing lens arrangement to vary a position of the focal plane along the optical path with respect to the sample stage, the controller configured to automatically control the translation mechanism to effect the relative movement of the sample stage and the focusing lens arrangement, the program code being executable by the controller to cause the controller to perform a method, the method comprising:

automatically adjusting a location of the focal plane along the optical path with respect to the sample stage to an optimum position at which the focal plane and an analysis region of the upper surface intersecting the optical path are at or are close to coincidence based on the controller automatically controlling the translation mechanism to cause the relative movement of the sample stage and the focusing lens arrangement to achieve the optimum position;

generating, using the controller, a mathematical transform which correlates measured data for the analysis region with optimum position of the focal plane along the optical path with respect to the sample stage and which is generated using the output of the detector that is generated based on electromagnetic radiation from plasma that is created based on the laser beam striking one or more other regions of the upper surface of the sample being incident on the detector, wherein the one or more other regions are different from the analysis region;

obtaining measured data for the analysis region of the upper surface; and applying the mathematical transform to the measured data to determine the optimum position of the focal plane along the optical path with respect to the sample stage at the analysis region.

13. The non-transitory computer-readable medium of claim 12, wherein the method executed by the controller further comprises:
- automatically controlling the translation mechanism to
  - cause the optical path to intersect a single other region of the one or more other regions of the upper surface, and
  - cause the relative movement of the sample stage and the focusing lens arrangement to achieve a plurality of different positions of the focal plane along the optical path with respect to the sample stage at the single other region of the upper surface;
- operating the laser to create a plasma at each position of the plurality of different positions; and
- obtaining into a memory a representation of the output of the detector that is generated based on electromagnetic radiation from the plasma that is created at each of the plurality of different positions indexed against position as intensity data for use in generating the mathematical transform.

14. The non-transitory computer-readable medium of claim 13, wherein generating the mathematical transform includes
- processing, in the controller, the intensity data to generate a mathematical expression linking detector output to position of the focal plane along the optical path with respect to the sample stage, and
- storing the mathematical expression in the memory as the mathematical transform.

15. The non-transitory computer-readable medium of claim 14, wherein
- obtaining the measured data includes operating the laser to create a plasma at the analysis region of the upper surface; and
- adjusting the location of the focal plane along the optical path with respect to the sample stage to the optimum position includes
  - calculating the optimum position for the analysis region based on applying the mathematical transform to the output of the detector that is generated based on electromagnetic radiation from the plasma that is created at the analysis region, and
  - operating the translation mechanism to move the sample stage to the optimum position.

16. The non-transitory computer-readable medium of claim 13, wherein generating the mathematical transform includes
- operating the controller to energize the translation mechanism and move the sample stage in a plane perpendicular to the optical path to serially intersect a plurality of different regions of the upper surface with the optical path;
- operating the laser to create a plasma at each of the plurality of different regions; and
- storing, in the memory, the output of the detector that is generated based on electromagnetic radiation from the plasma that is created at each region of the plurality of different regions indexed against location of a corresponding region in the plane perpendicular to the optical path for use in generating the mathematical transform based on a comparison of the output of the detector that is generated based on electromagnetic radiation from plasma that is created at each location of the corresponding region in the plane with the intensity data.

* * * * *